United States Patent [19]

Ullah

[11] Patent Number: 5,639,096
[45] Date of Patent: Jun. 17, 1997

[54] OIL FILM COOLED FACE SEAL

[75] Inventor: M. Rifat Ullah, Phoenix, Ariz.

[73] Assignee: AlliedSignal Inc., Morris Township, N.J.

[21] Appl. No.: 678,221

[22] Filed: Jul. 11, 1996

[51] Int. Cl.⁶ .................................................. F16J 15/34
[52] U.S. Cl. ........................ 277/22; 277/67; 277/133
[58] Field of Search ............................. 277/18, 22, 25, 277/67, 74, 96.1, 133, 215

[56] References Cited

U.S. PATENT DOCUMENTS

| 1,815,096 | 5/1931 | Cedervall . | |
|---|---|---|---|
| 1,876,520 | 4/1932 | Newkirk et al. . | |
| 2,005,587 | 8/1935 | Lorig . | |
| 2,244,450 | 4/1941 | Emi . | |
| 2,598,381 | 5/1952 | Hoffman | 277/67 |
| 2,990,202 | 9/1961 | Dennison . | |
| 2,992,842 | 7/1961 | Shevchenko et al. | 277/22 |
| 3,147,013 | 9/1964 | Tracy . | |
| 3,408,085 | 10/1968 | Van Spijk et al. . | |
| 3,804,424 | 4/1974 | Gardner . | |
| 4,406,459 | 9/1983 | Davis et al. | 277/74 |
| 4,928,978 | 5/1990 | Shaffer et al. | 277/74 |
| 5,183,270 | 2/1993 | Alten et al. | 277/96.1 |
| 5,538,258 | 7/1996 | Hager et al. | 277/67 |

FOREIGN PATENT DOCUMENTS

| 1415233 | 11/1964 | France | 277/22 |
|---|---|---|---|
| 524515 | 5/1931 | Germany | 277/96.1 |

Primary Examiner—Scott Cummings
Attorney, Agent, or Firm—Jerry J. Holden; James W. McFarland

[57] ABSTRACT

Disclosed is an oil film cooled face seal that is comprised of an annular stator having a flat surface in rubbing contact with the flat sealing surface of a rotor. The rotor has a flange portion extending radially from a base portion. The base portion has a plurality of holes extending radially therethrough in fluid communication with a source of cooling oil. One side of the flange portion comprises the flat sealing surface. The opposite side, or backface, has a plurality of external radially spaced apart annular grooves criss-crossing a plurality of external circumferentially spaced apart substantially radial grooves. Each of the radial grooves is aligned with and in fluid communication with a corresponding hole in the base portion, and extends fully across the backface. Upon rotation of the rotor, centrifugal force causes the cooling oil to flow from the cooling oil source, through the hole, through the radial groove wherein aerodynamic force causes a portion of the oil to flow across the backface and into the annular grooves, thereby convectively cooling the rotor.

9 Claims, 2 Drawing Sheets

OIL FILM COOLED FACE SEAL

TECHNICAL FIELD

The present invention relates generally to face seals used for sealing along rotating shafts, and in particular, to a face seal having an oil film cooled seal rotor.

BACKGROUND OF THE INVENTION

Face seals are used in gas turbine engines to prevent the leakage of fluid along rotating shafts where the shaft extends through a stationary structure such as a wall or partition. Referring to FIG. 1, a typical face seal is comprised of a stationary stator 22, having a flat surface 25 that rubs against a flat surface 17 of a rotating rotor 20. The rubbing of these surfaces generates significant amounts of heat and as a result high temperatures and thermal gradients within the rotor 20. These thermal gradients must be managed to prevent failure of the seal. A major contributor to this adverse thermal reaction in many seals is a lack of adequate means for carrying excess heat away from the rotor. When the thermal load of the seal is not managed, the formation of coke (burned oil) at the sealing flat surface 25 can occur. Also, the adverse thermal gradients cause the flat surface of the rotor 20 to swing away from the flat surface of the stator 22 resulting in leakage.

One approach to this problem has been to make the rotor from ceramics. A disadvantage of ceramics is their brittleness. A related disadvantage of ceramics is the need for sophisticated and often complex schemes for mounting the ceramic rotor, due both to the brittleness and to the low thermal growth of ceramic. Another approach to this problem has been to provide external cooling of the rotor 20 in the form of oil jets. Yet another approach is to internally cool the rotor using coolant passages, as for example in U.S. Pat. No. 2,990,202 issued to W. T. Dennison on Jun. 27, 1961. In Dennison, oil from inside a shaft enters the inner diameter portion of a seal rotor and flows through passages defining a labyrinth path to an outer diameter surface where the oil is discharged. However, these approaches add significant complexity to the design of the rotor, are expensive, and are not always practical due to space limitations.

Accordingly there is a need for an inexpensive oil cooled face seal configured to dissipate heat from the rotor in the most efficient manner when subjected to high thermal loads.

SUMMARY OF THE INVENTION

An object of the present invention is to provide an inexpensive oil cooled face seal configured to dissipate very high amounts of heat.

Another object of the present invention is to achieve very high heat dissipation from the rotor within a confined space.

The present invention achieves these objectives by providing an oil film cooled face seal that is comprised of an annular stator having a flat surface in rubbing contact with the flat sealing surface of a rotor. The rotor has a base portion and a flange portion extending radially therefrom. The base portion has a plurality of holes extending radially therethrough in fluid communication with a source of cooling lubricant, such as oil. One side of the flange portion comprises the flat sealing surface. The opposite side (or backface) has a plurality of external radially spaced apart annular grooves criss-crossing a plurality of external circumferentially spaced apart substantially radial grooves, where each of the radial grooves is aligned with and in fluid communication with a corresponding hole in the base portion, and extends fully across the backface. Each of the radial grooves has substantially less cross-sectional area than each of the holes and substantially greater depth than the annular grooves, whereby upon rotation of the rotor centrifugal force causes the cooling oil to flow from the cooling oil source, through the hole, through the radial groove wherein aerodynamic force causes a portion of the oil to flow through the annular grooves, thereby convectively cooling the rotor.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
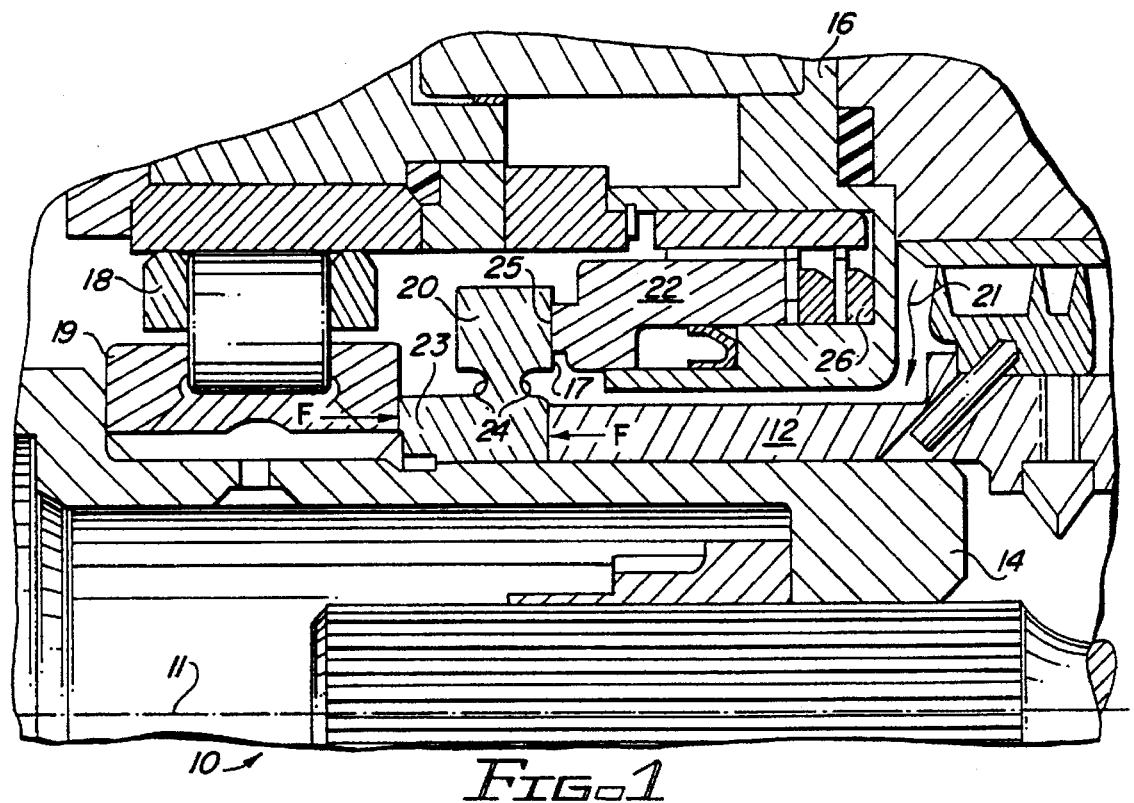
FIG. 1 is a cross-sectional view of a portion of a gas turbine engine having a conventional face seal.

Referring to the drawings, FIG. 1 shows a compressor section of a gas turbine engine generally denoted by the reference numeral 10. The compressor 10 has a rotating compressor disk 12 coupled to the rotating shaft 14. Circumscribing the shaft 14 is a stationary housing 16. The housing 16 is mounted atop a bearing 18 having an inner race 19 which is mounted on the shaft 14. An annular metallic seal rotor 20 is mounted for rotation on the shaft 14 and has a base portion 23 that abuts at one axial end the inner race 19 and at the other axial end the compressor disk 12. A portion of the housing 16 circumscribes a portion of the compressor disk 12 defining a leakage path, referenced by the arrow 21. Mounted within the housing 16 is a conventional, annular carbon stator 22 that has a flat surface 25 that is in rubbing contact with a portion of flat surface 17 of the rotor 20. The surfaces 17 and 25 are flat as manufactured to within three helium light bands which is about 0.000040 inches. A spring 26 forces the surfaces 17 and 25 together to seal the leakage path 21. Due to the manner of engine assembly, a compressive clamping force represented by arrows F is transmitted through the base portion of the rotor 20. The compressor 10 extends axially and is concentric about an engine centerline 11.

Figure 2:
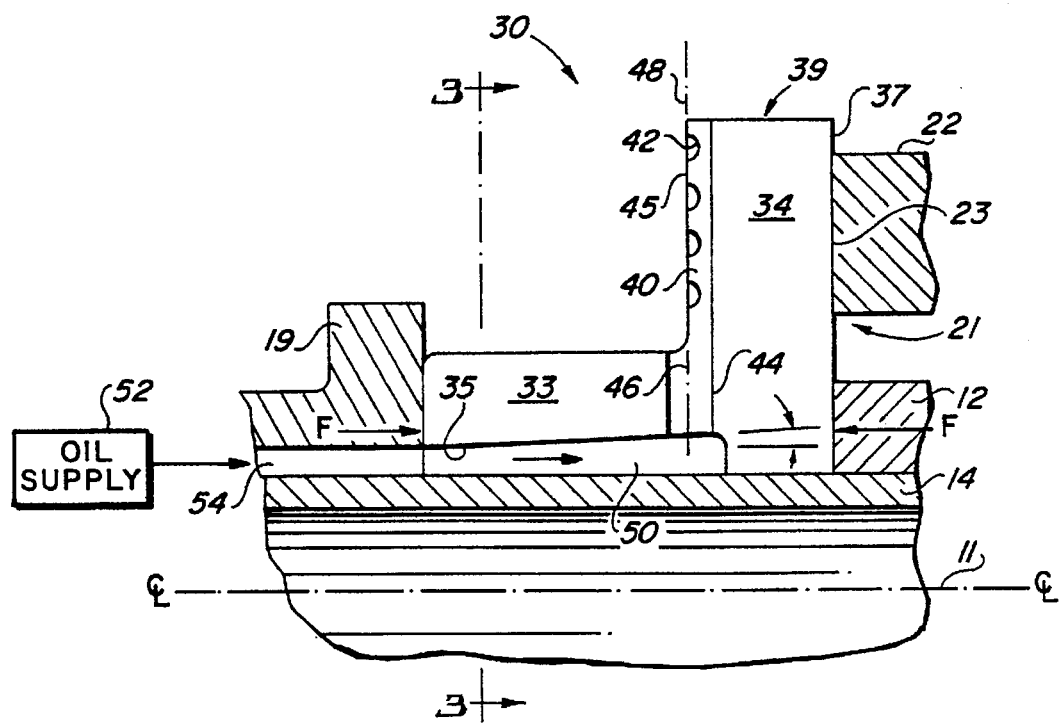
FIG. 2 is a cross-sectional view of the face seal contemplated by the present invention.
Figure 3:
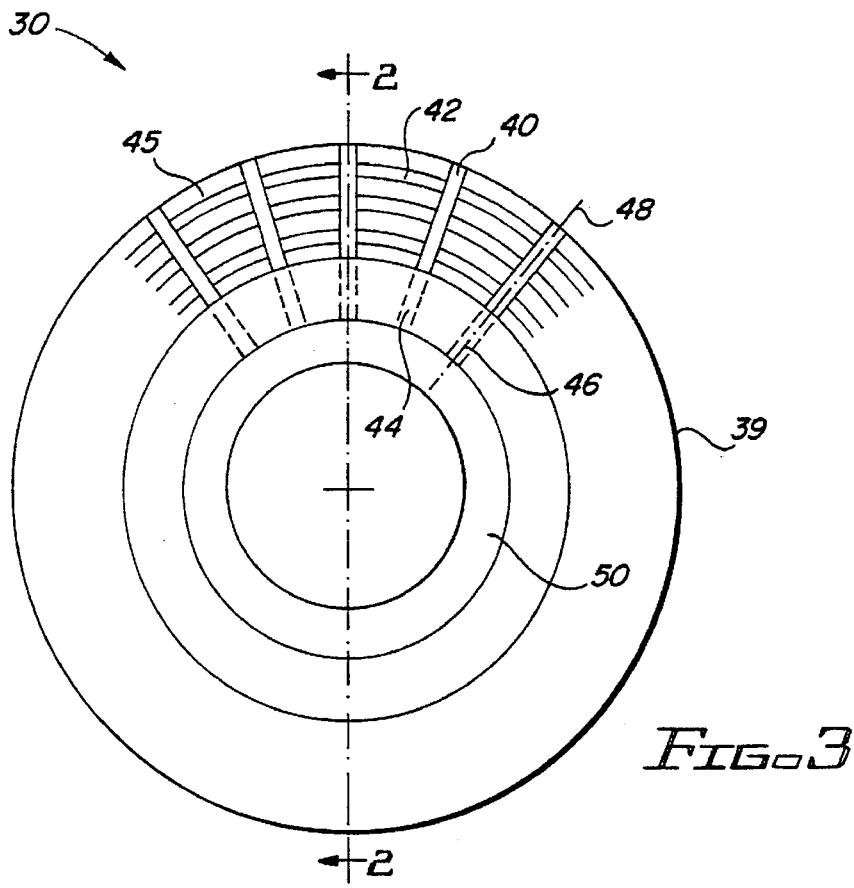
FIG. 3 is an axial view of the seal rotor of the face seal of FIG. 2
Figure 4:
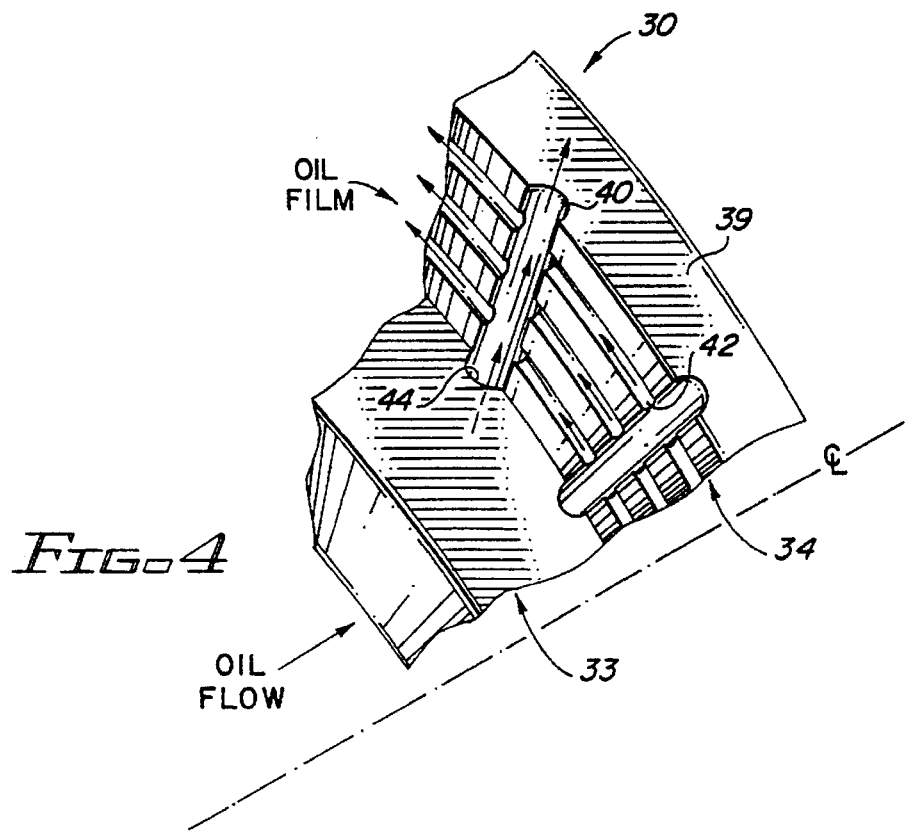
FIG. 4 is a perspective view of the seal rotor of the face seal of FIG. 2, taken along line 3—3.

In the preferred embodiment, the annular conventional seal rotor 20 is replaced with a rotor 30 as shown in FIGS. 2 through 4. Rotor 30 has a radially extending flange portion 34 atop a generally cylindrical base portion 33. Flange portion 34 is bounded axially by the flat surface 37 and a backface surface 45, and radially by an outer surface 39. The backface surface 45 has a plurality of substantially radially extending and circumferentially spaced apart grooves 40. The radial grooves 40 extend fully across the backface surface 45 and criss-cross a plurality of shallower concentric annular grooves 42 in backface surface 45. As a consequence of being shallower, the annular grooves 42 are discontinuous at each crossing of the radial grooves 40; whereas the radial grooves 40 continue substantially uninterrupted across backface surface 45.

Aligned with the radially innermost end of each of the radial grooves 40 is a hole 44 extending radially through the base portion 33. As explained in greater detail below, it is important that the cross-sectional area of each hole 44 is greater than the cross sectional area of the corresponding radial groove 40, to ensure efficient distribution of the oil on the backface surface 45, and thereby maximize the convective cooling of the rotor. In the preferred embodiment, radial grooves 40 are of a semicircular cross-section having a radius equal to that of holes 44. The desired area relationship is assured because the area of the groove 40 must be less than the area of a hole 44 having the same radius. Moreover, by positioning holes 44 so that the axis 46 of the hole 44 is aligned with the axis 48 of the groove 44, a smooth transition from the surface of the hole to surface of the groove is provided.

It will be apparent that such a relationship between the holes 44 and radial grooves 40 is the result of a machining process, where before forming the backface surface 45, the holes 44 are drilled all the way through the unfinished rotor. Subsequently by machining the backface shape, the radial grooves 40 are revealed, having the previously described area and positional relationship with holes 44.

Alternatively, holes 44 and grooves 40 may be straight, but at an angle to the radial direction, or slightly curved. In any case, the angle between the holes 44 or grooves 40 and the radial direction should nowhere exceed 20 degrees.

Referring again to FIG. 2, an inwardly facing surface 35 of the base portion 33 of rotor 30 is radially spaced apart from the shaft 14, forming an annular passage 50 therebetween. Passage 50 extends axially from the end of base portion 33 abutting bearing inner race 19, to the radially inner extent of holes 44. The passage 50 is in fluid communication with a coolant source 52 through axial grooves 54 in the inside surface of bearing inner race 19. Surface 35 is also tapered, from a relatively small diametric size at the end adjacent the bearing to a larger diametric size at the end terminating at holes 44. The angle of taper of surface 35 should be at least one degree. In addition, roughening of the surface 35 receives the pumping capacity of the passage 50.

In operation, a lubricant such as oil is caused to flow from the source 52, underneath bearing inner race 19 via grooves 54, and to the passage 50. During shaft rotation, at typically high speed, centrifugal force acting on the oil within passage 50 in combination with the taper of surface 35 causes the oil to be pumped or driven toward the holes 44. As shown in FIG. 4, the oil is caused by centrifugal action to enter and flow radially outward through the holes 44, continuing radially outward through the grooves 40, and ultimately discharging from the rotor at outer surface 39. Within the holes 44, the coriolus force imparts a spin the oil flowing therethrough.

Because the cross-sectional area of the radial grooves 40 is less than that of the holes 44, the stream of oil from the holes 44 exceeds the flow capacity of the radial grooves. The result is that the stream of oil carried by radial grooves protrudes beyond the backface surface 45. Aerodynamic force generated upon rotation of the rotor then forces this excess oil into the annular grooves 42, thereby cooling the rotor 30.

A benefit of the present invention is that the grooves in the backface enhance cooling of the rotor by increasing the surface area available for cooling without increasing the size of the rotor. Cooling is further enhanced because the grooves improve oil retention, thereby increasing the amount of time that the backface is exposed to the cooling oil. Yet another benefit of the present invention is the reduced complexity, weight, and cost over conventional oil jet cooled face seals.

Other modifications and alterations to the above described embodiments will be apparent to those skilled in the art. Accordingly, this description of the invention should be considered exemplary in nature and not as limiting to the scope and spirit of the invention which should be determined from the following claims.

What is claimed is:

1. A face seal for use between a rotatable shaft and a housing wall through which said shaft extends in a gas turbine engine having a source of cooling lubricant, comprising:

an annular stator mounted to said housing wall and having a sealing surface;

a rotor having a cylindrical base portion mounted for rotation to said shaft, said base portion having a plurality of holes extending radially therethrough in fluid communication with said cooling lubricant source;

said rotor also having an annular flange portion extending radially outward from said base portion, said flange portion defining a first axially facing surface, a portion of which is in sealing contact with said sealing surface of said stator, and a second axially facing surface opposite said first surface and having a plurality of external radially spaced apart annular grooves crisscrossing a plurality of external, circumferentially spaced apart substantially radial grooves, each of said radial grooves being aligned and in fluid communication with a corresponding one of said holes in said base portion and extending therefrom fully across said second surface, whereby upon rotation of said rotor, centrifugal force causes said cooling lubricant to flow from said cooling lubricant source, through said holes, and into said radial grooves whereupon aerodynamic force causes a portion of said lubricant to flow across said second surface and said annular grooves, thereby cooling said rotor.

2. The face seal of claim 1 wherein each of said radial grooves has substantially less cross-sectional area than each of said corresponding holes and substantially greater depth than said annular grooves.

3. The face seal of claim 1 wherein said cylindrical base portion has an inner surface with a portion radially spaced apart from said shaft forming an annular passage therebetween, said annular passage interconnecting said cooling lubricant supply source and said radially extending holes.

4. The face seal of claim 3 wherein said inner surface portion is tapered.

5. The face seal of claim 4 wherein said taper is in a direction to cause oil to be pumped toward said radially extending holes upon rotation of said rotor.

6. The face seal of claim 5 wherein said taper is at least one degree from the axial direction.

7. The face seal of claim 1 wherein said radial grooves are at an angle from the radial direction, said angle measured in the plane of said other surface.

8. The face seal of claim 7 wherein said angle is at most twenty degrees.

9. The face seal of claim 1 wherein the length of each of said holes is at least five times its diameter.

* * * * *

UNITED STATES PATENT AND TRADEMARK OFFICE
CERTIFICATE OF CORRECTION

PATENT NO. : 5,639,096

DATED : June 17, 1997

INVENTOR(S) : M. Rifat Ullah

It is certified that error appears in the above-identified patent and that said Letters Patent is hereby corrected as shown below:

Col 3, line 41, delete "receives", insert "increases"

Signed and Sealed this

Sixteenth Day of December, 1997

Attest:

BRUCE LEHMAN

*Attesting Officer*   *Commissioner of Patents and Trademarks*